Oct. 20, 1936. K. D. SMITH ET AL 2,057,925
VISCOLIZER VALVE
Filed July 10, 1935
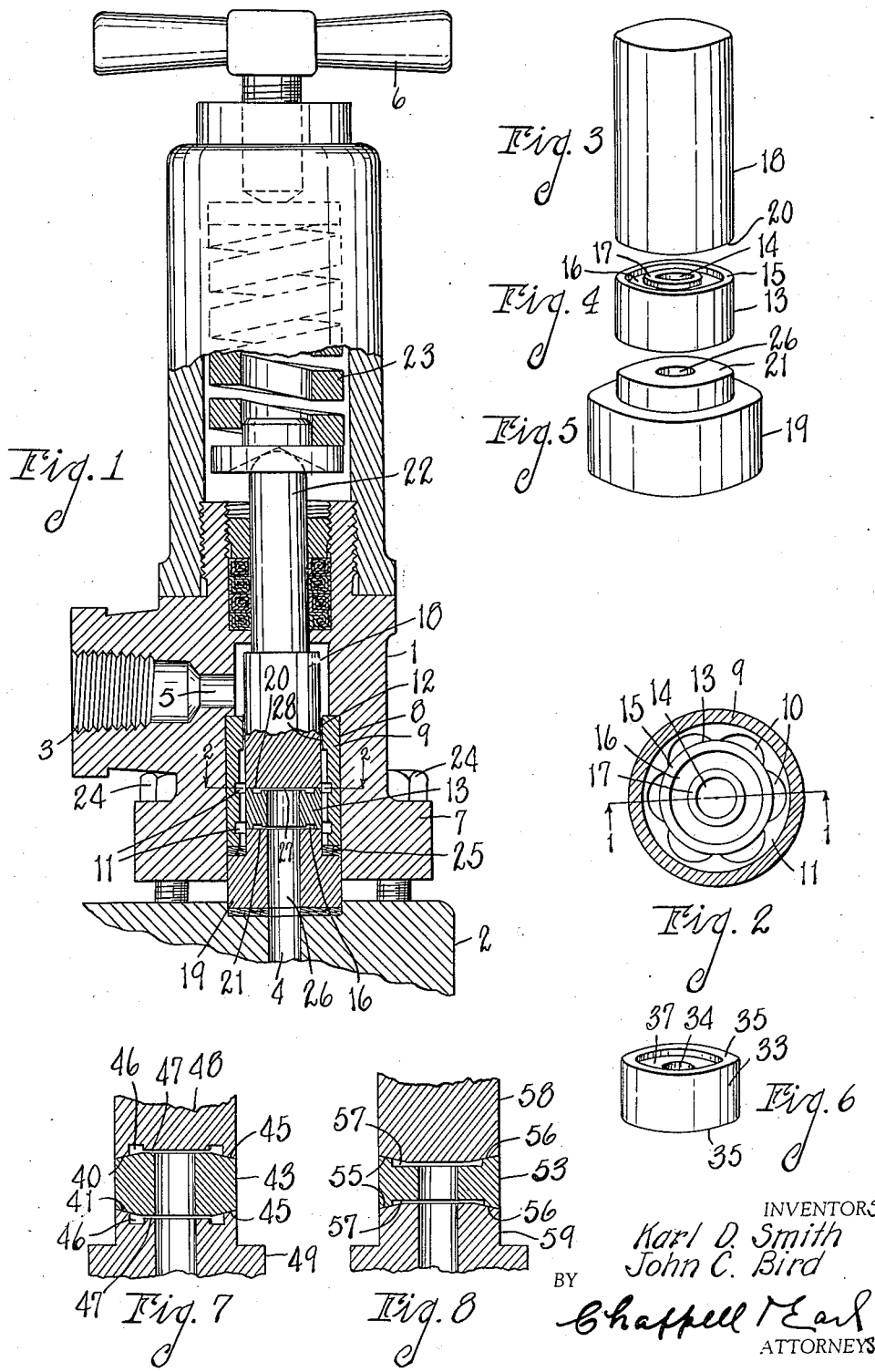
INVENTORS.
Karl D. Smith
John C. Bird
BY Chappell Earl
ATTORNEYS Patented Oct. 20, 1936

2,057,925

UNITED STATES PATENT OFFICE 2,057,925

VISCOLIZER VALVE

Karl D. Smith and John C. Bird, Battle Creek, Mich., assignors to Union Steam Pump Company, Battle Creek, Mich.

Application July 10, 1935, Serial No. 30,642

12 Claims. (Cl. 99—265)

The main objects of this invention are:

First, to provide an improved homogenizing or viscolizing valve.

Second, to provide a valve of the foregoing character having greatly increased capacity over other valves of this type previously known to the art.

Third, to provide a viscolizer valve which is simple and economical in its parts and very efficient and effective in operation.

Objects relating to details and economies of our invention will appear from the description to follow. The invention is defined and pointed out in the claims.

Embodiments of our invention are illustrated in the accompanying drawing, in which:

Fig. 1 is a fragmentary view partially in side elevation and mainly in vertical section on a line corresponding to line 1—1 of Fig. 2.

Fig. 2 is an enlarged transverse detail sectional view taken on a line corresponding to line 2—2 of Fig. 1.

Fig. 3 is an enlarged perspective view of the outer valve member.

Fig. 4 is a similar view of the intermediate valve member.

Fig. 5 is a similar view of the inner valve member.

Fig. 6 is a perspective view of a modification of the intermediate valve member.

Fig. 7 is a fragmentary vertical sectional view of another modification.

Fig. 8 is a similar view of a further modification.

Referring to the drawing, numeral 1 in general designates a viscolizing or homogenizing valve which is shown mounted upon the cylinder block 2 of a pump and provided with an outlet nipple 3. The fluid to be treated is delivered from the pump under high pressure through delivery passage 4 of the pump and after being treated is discharged through the outlet port or passage 5 of the valve. The valve is provided with a pressure regulating handle 6. The main or outer valve casing 7 is formed with a vertical bore 8 in which is fitted the cylindrical inner casing member or breaker ring 9, this inner casing member or breaker ring being seated against a shoulder provided therefor within the bore. The member 9 has spaced internal longitudinal flutes or groove-like passages 10 and spaced internal annular grooves 11 and an internally cylindrical portion 12.

Three cooperating valve members are provided, designated by numerals 13, 18 and 19, which for convenience we designate the member 19 as an inner valve member, the member 18 as an outer valve member, and the member 13 as an intermediate valve member. The intermediate valve member 13 is disposed between the inner valve member 19 and the outer valve member 18 for free floating movement, restricted of course to the spacing of said inner and outer valve members. In operation a film of liquid is above and below the intermediate valve member 13. By providing the recesses 16 and 20 or their equivalent, the central position of the member 13 is assured and the proper discharge above and below is secured. The viscolizing is assured by the thin films thus secured.

The inner valve member has an axial bore 14, and in the embodiment shown in Figs. 1 to 5 inclusive, right end faces 15 each provided with an annular groove 16 and a central recess or reduced end portion 17 communicating therewith and with the central passage. The valve members 18 and 19 terminate in flat seat faces 20 and 21 coacting with the end faces 15 of the intermediate valve member 13.

The spring 23 acting through the stem 22 provides pressure for the valve members to suitably resist the fluid to be treated which is directed from the pump under high pressure.

In the embodiment illustrated, the inner valve member 19 is clamped within the inner end of the valve casing bore by means of the bolts 24 which connect the valve casing 7 to the cylinder block, a packing 25 being disposed between the valve member 19 and the lower end of the inner casing member or breaker ring 9. The inner valve member 19 has an axial fluid passage 26 communicating with the delivery passage of the pump and the passage of the intermediate valve member. The outer valve member is preferably in the form of a plunger and has such fit within the cylindrical outer portion of the valve casing member 9 as to permit restricted passage of the material treated to outlet 5. The annular grooves 11 of the breaker ring or inner casing member are disposed in the plane of the valve faces so that the material treated is discharged between the valve members into these grooves.

As is understood in devices of this character, the material treated, such for example as cream, is discharged by the pressure with which it is delivered between the coacting surfaces of the valve members and thoroughly viscolized or homogenized. It will be understood that normally the coacting valve surfaces are urged against each other by the spring 23; that the fluid to be treated lifts the outer valve member against the force of the spring and it is found the intermediate valve member floats or becomes centered so that the material is discharged at both sides thereof. The end recesses facilitate this action. After being discharged into the internal annular grooves the material is forced upwardly through the flutes 10 and then through the narrow cylindrical space 28 between the outer valve member and the internally cylindrical portion of the valve casing to the port 5. Thus the material treated is thoroughly viscolized or homogenized in passing through the valve. The valve has about double the capacity of the previously known types owing to the use of the floating intermediate valve member. These parts are so designed that they may be easily formed of material highly resistant to wear and may be renewed as occasion requires.

If desired, a floating valve member 33, Fig. 6, may be provided having end faces 35 each having a central annular recess 37 communicating directly with the central bore 34 thereof.

Further, as shown in Fig. 7, the intermediate valve member 43 may be provided with inclined end faces 45 for coaction with correspondingly inclined valve seats 40 and 41 on the valve members 48 and 49, respectively. In this case, the valve members 48 and 49 are provided with annular grooves 46 and recesses 47 for causing the fluid under pressure to center the intermediate valve member 43.

Fig. 8 illustrates another modification in which the end faces 55 of the intermediate valve member 53 are inclined oppositely compared with Fig. 7, the valve seats 56 of the valve members 58 and 59 being correspondingly inclined. In this case, the intermediate valve member 53 is provided with end recesses 57 for causing the fluid under pressure to center the intermediate valve member. The inclination of the meeting valve seats and end faces affects the viscosity of the viscolized material.

From the foregoing description of our invention, it will be apparent to those skilled in the art that we provide an improved viscolizing valve which is simple and economical in its parts and very efficient and effective in operation, the valve having a very large capacity. The valve is adapted to handle a variety of fluids, such as liquids desired for human consumption, especially dairy products. The valve is also adapted to viscolize inorganic fluids and liquids, such as is required in the manufacture of high quality paints.

We have illustrated and described our improvements in embodiments which we have found very practical. We have not attempted to illustrate or describe other embodiments or adaptations as it is believed this disclosure will enable those skilled in the art to embody or adapt our improvements as may be desired.

Although we have shown and described certain specific embodiments of our invention, we are fully aware that many modifications thereof are possible. Our invention is therefore not to be restricted except insofar as is necessitated by the prior art and by the spirit of the appended claims.

Having thus described our invention, what we claim as new and desire to secure by Letters Patent, is:

1. In a viscolizer valve, the combination of a cylindrical casing member having spaced internal longitudinal flutes and spaced internal annular grooves and an internally cylindrical outer end portion, an intermediate valve member disposed within said casing member for free longitudinal floating movement therein and having an axial bore and right end faces each provided with an annular groove and a central annular recess extending from said bore to said groove, relatively movable end valve members projecting into the opposite ends of said casing member and terminating in valve seats adapted for coaction with the end faces of said intermediate valve member, and spring means acting to move said end valve members toward each other with the transverse planes of abutment between the ends of the valve members passing through the transverse centers of said internal annular grooves, one of said end valve members being stationary relative to said casing member and having an axial fluid inlet bore, the other end valve member being longitudinally movable relative to said casing member and having an imperforate end facing said inlet bore, the internal annular end flange providing a guide bearing for the movement of said last named valve member and being slightly spaced therefrom to form a cylindrical fluid outlet passage.

2. In a viscolizer valve, the combination of a cylindrical casing member having spaced internal annular grooves and an internally cylindrical outer end portion, an intermediate valve member disposed within said casing member for free longitudinal floating movement therein and having an axial bore and right end faces each provided with an annular groove and a central annular recess extending from said bore to said groove, relatively movable end valve members projecting into the opposite ends of said casing member and terminating in valve seats adapted for coaction with the end faces of said intermediate valve member, and spring means acting to move said end valve members toward each other with the transverse planes of abutment between the ends of the valve members passing through the transverse centers of said internal annular grooves, one of said end valve members having an axial fluid inlet bore, the other end valve member having an imperforate end facing said inlet bore, the internal annular end flange providing a guide bearing for the movement of one of said valve members and being spaced therefrom to form a cylindrical fluid outlet passage.

3. In a viscolizer valve, the combination of a cylindrical casing member having spaced internal longitudinal flutes and spaced internal annular grooves and an internally cylindrical outer end portion, an intermediate valve member disposed within said casing member for free longitudinal floating movement therein and having an axial bore and end faces each provided with a central annular recess extending from said bore, relatively movable end valve members projecting into the opposite ends of said casing member and terminating in valve seats adapted for coaction with the end faces of said intermediate valve member, and spring means acting to move said end valve members toward each other with the ends of the valve members at the transverse centers of said internal annular grooves, one of said end valve members having an axial fluid inlet bore, the other end valve member having an imperforate end facing said inlet bore, the internal annular end flange providing a guide bearing for the movement of one of said valve members and being spaced therefrom to form a cylindrical fluid outlet passage.

4. In a viscolizer valve, the combination of a cylindrical breaker ring having spaced internal longitudinal flutes and spaced internal annular grooves, an intermediate valve member disposed within said breaker ring for free longitudinal floating movement therein and having an axial bore and inclined end faces, relatively movable end valve members projecting into the opposite ends of said breaker ring and terminating in inclined valve seats adapted for coaction with the inclined end faces of said intermediate valve member, and adjustable spring means acting to move said end valve members toward each other with the annular abutments between the ends of the valve members lying within the planes of the transverse centers of said internal annular grooves, one of said end valve members being stationary relative to said breaker ring and having an axial fluid inlet bore, the other end valve member being longitudinally movable relative to said breaker ring and having an imperforate end facing said inlet bore, said valve members having end recesses within said valve seats acting to cause the fluid to center said intermediate valve member in operation.

5. In a viscolizer valve, the combination of a cylindrical breaker ring having spaced internal longitudinal flutes and spaced internal annular grooves, an intermediate valve member disposed within said breaker ring for free longitudinal floating movement therein and having an axial bore and inclined end faces, relatively movable end valve members projecting into the opposite ends of said breaker ring and terminating in inclined valve seats adapted for coaction with the inclined end faces of said intermediate valve member, anad spring means acting to move said end valve members toward each other with the annular abutments between the ends of the valve members lying within the planes of the transverse centers of said internal annular grooves, one of said end valve members having an axial fluid inlet bore, the other end valve member having an imperforate end facing said inlet bore, said valve members having end recesses within said valve seats acting to cause the fluid to center said intermediate valve member in operation.

6. In a viscolizer valve, the combination of a cylindrical breaker ring having spaced internal longitudinal flues and spaced internal annular grooves, an intermediate valve member disposed within said breaker ring for free longitudinal floating movement therein and having an axial bore and end faces, relatively movable end valve members projecting into the opposite ends of said breaker ring and terminating in valve seats adapted for coaction with the end faces of said intermediate valve member, and spring means acting to move said end valve members toward each other with the annular abutments between the ends of the valve members lying within the planes of the transverse centers of said internal annular grooves, one of said end valve members having an axial fluid inlet bore, the other end valve member having an imperforate end facing said inlet bore.

7. In a viscolizer valve, the combination of a cylindrical casing member having spaced internal longitudinal flutes and spaced internal annular grooves, an intermediate valve member disposed within said casing member for free longitudinal floating movement therein and having an axial bore and end faces each provided with a central recess extending from said bore, relatively movable end valve members projecting into the opposite ends of said casing member and terminating in valve seats adapted for coaction with the end faces of said intermediate valve member, and spring means acting to move said end valve members toward each other, one of said end valve members being stationary relative to said casing member and having an axial fluid inlet bore, the other end valve member being longitudinally movable relative to said casing member and having an imperforate end facing said inlet bore, the casing providing a guide bearing for the movement of said last named valve member and being slightly spaced therefrom to form a cylindrical fluid outlet passage.

8. In a device of the class described, the combination of a casing having a bore provided with an internal shoulder, an inner casing member disposed within said bore in supporting engagement with said shoulder and having spaced annular grooves with longitudinal grooves connecting said annular grooves and having an internally cylindrical portion at its outer end, an inner valve member disposed in the inner end of said bore and having a flat valve seat face and an inlet passage opening centrally of said face, an outer plunger-like valve member fitting within said cylindrical portion of the said inner casing member to permit the passage of fluid and having a flat valve seat face in opposed relation to the valve seat face of said inner valve member, an intermediate valve member coacting with said valve seat faces of said inner and outer valve members and having a central passage and provided wtih a reduced central portion in each end surrounded by an annular groove, the said valve faces being in the plane of said grooves in said inner casing member, said valve casing having an outlet beyond the outer end of the inner casing member, and an adjustable spring pressure means operatively associated with said outer valve member.

9. In a device of the class described, the combination of a casing member having spaced annular grooves with longitudinal grooves connecting said annular grooves and having an internally cylindrical portion at its outer end, an inner valve member disposed in the inner end of said bore and having a flat valve seat face and an inlet passage opening centrally of said face, an outer plunger-like valve member fitting within said cylindrical portion of the said casing member to permit the passage of fluid and having a flat valve seat face in opposed relation to the valve seat face of said inner valve member, an intermediate valve member coacting with said valve seat faces of said inner and outer valve members and having a central passage and provided with a reduced central portion in each end surrounded by an annular groove, the said valve faces being in the plane of said grooves in said inner casing member, and an adjustable spring pressure means operatively associated with said outer valve member.

10. In a device of the class described, the combination of a casing member having spaced annular grooves and an internally cylindrical portion at its outer end, an inner valve member having a valve seat face and an inlet passage opening centrally of said face, an outer plunger-like valve member fitting within said cylindrical portion of the said casing member to permit the passage of fluid and having a valve seat face in opposed relation to the valve seat face of said inner valve member, a floating intermediate valve member coacting with said valve seat faces of said inner and outer valve members and having a central passage and provided with a recess in each end open to said passage, the said valve faces being in the plane of said grooves in said inner casing member, and a pressure means operatively associated with said valve members.

11. In a viscolizer valve, the combination of a casing member having spaced annular grooves with longitudinal internal passages connecting said grooves and an internally cylindrical portion at its outer end, an inner valve member having an inlet passage, an outer valve member within said casing member, said inner and outer members having valve faces in the planes of said grooves in said casing member, and an intermediate valve member having an axial passage floatingly disposed between said inner and outer valve members, said valve members being conformed to provide annular seating surfaces with recesses within said seating surfaces communicating with the said passage of said intermediate valve member.

12. In a viscolizer valve, the combination of a casing member, a pair of spaced facing valve members aligned within said casing member, one of said valve members being provided with an inlet passage, an intermediate valve member having a passage therethrough communicating with said inlet passage and disposed floatingly between said pair of valve members and having annular grooves in its ends communicating with said passage, said casing member having annular recesses of restricted area into which fluid is discharged from between said valve members, and pressure means operatively associated with said valve members.

KARL D. SMITH.
JOHN C. BIRD.